United States Patent Office 2,850,401
Patented Sept. 2, 1958

2,850,401

MERCURY-CONTAINING CADMIUM PIGMENT PRODUCTION PROCESS

John O. Hay, Bratenahl, Ohio, assignor to The Harshaw Chemical Company, Cleveland, Ohio, a corporation of Ohio No Drawing. Application April 25, 1956
Serial No. 580,438

6 Claims. (Cl. 106—301)

This invention relates to a process for the manufacture of mercury-containing cadmium pigments. More particularly, the invention relates to a process for producing red pigments or colors utilizing cadmium sulfide, mercury and/or a compound thereof and an alkali thiosulfate and/or an alkali dithionite as the principal reactive ingredients.

Red pigments of the cadmium sulfoselenide types have been extensively employed for paint mixtures and other color applications such as for vitreous enamels. These red pigments contain cadmium, sulfur and selenium and their color depends on the method that is used in their manufacture as well as the variation in composition and ingredients of the final product. In general, they have found wide commercial acceptance because of their superior color retention, tonal and pigment qualities. Recent changes in the market prices of selenium, an essential ingredient of the pigment, have, however, materially reduced the quantities of the pigment sold, the higher prices of the pigment, reflecting the increase in selenium costs, having met with considerable buyer resistance. Consequently there is an immediate need for a cheaper substitute pigment or color having the basic qualities of the cadmium sulfoselenide types.

It is an object of the invention described herein to provide a process for producing mercury-modified cadmium sulfide containing red pigments. It is a further object of the invention to provide a process for producing mercury-modified cadmium sulfide containing dry colors characterized by the fact that mercury sulfide is produced in situ during calcination.

Broadly the process of the invention contemplates calcination of an admixture of cadmium sulfide, an alkali sulfur containing compound selected from the group consisting of alkali thiosulfates and alkali dithionites, and a source of mercury reactive with said alkali sulfur compound under calcination conditions to form mercury sulfide therefrom. The alkali dithionites frequently referred to as the hydrosulfites, are considered the equivalent of the alkali thiosulfates since upon calcination they break down, it is believed, to the thiosulfate substantially in accordance with the following reaction exemplifying the decomposition of sodium dithionite:

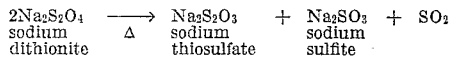

$$2Na_2S_2O_4 \xrightarrow{\Delta} Na_2S_2O_3 + Na_2SO_3 + SO_2$$

sodium dithionite → sodium thiosulfate + sodium sulfite + SO₂

Attempts at producing a red colored pigment by calcining a mere physical mixture of cadmium sulfide and mercury sulfide have, in general, proven unsuccessful. Special treatments of the respective ingredients are necessary in order to develop the color aspects of the red pigment. The reaction of the ingredients under calcination conditions, to develop a red color, which reaction is believed to be one involving the formation of a solid solution, is relatively slow and results in considerable loss of the volatile components of the mixture. At best, attempts at producing a pigment in such a manner have only accomplished colors of relatively low intensity and purity. According to the invention it has been found that by producing mercury sulfide in situ during the calcination through the mechanism of a reaction involving mercury or a compound thereof and an alkali thiosulfate or an alkali dithionite that the intensity of the color may be increased, and in general, a color closely approaching the qualities associated with the sulfoselenides may be produced.

As previously indicated, the essential ingredients of a mixture to be calcined to form a red color according to the invention consist of cadmium sulfide, an alkali sulfur containing compound and what may be termed a "mercury supplier." The cadmium sulfide may be utilized alone in a relatively pure state or may have an inert compound such as barium sulfate associated therewith. For example, cadmium sulfide as associated with barium sulfate in the cadmium lithopones of commerce has been found to be an excellent source of raw material which may be utilized in the process described herein. As is well known, the cadmium lithopones of commerce may be produced in several different manners, for example, one of which is by the calcination of a co-precipitated mixture of barium sulfate and cadmium sulfide. Other methods of producing the cadmium lithopones are known to those skilled in the art and in general, it is contemplated that the cadmium lithopones may be employed as a cadmium sulfide source according to the invention in either the calcined or uncalcined state. It has been found preferable to utilize an uncalcined cadmium lithopone or an uncalcined source of cadmium sulfide as the basic ingredients for the mixture, although the process described herein is not necessarily limited thereto, since successful results also have been obtained through the employment of calcined forms of cadmium sulfide including calcined lithopones. The cleanest and most brilliant colors appear to result when an uncalcined lithopone mixture or an uncalcined cadmium sulfide is utilized. This is rather surprising in some respects since it has previously been suggested that the calcination of the cadmium sulfide or the lithopone would be necessary, in order to convert the cubic structure of cadmium sulfide as usually precipitated to the hexagonal form which has been found to be more stable as a pigment. In line with experimental work, further consideration suggests that the mobility of the crystal lattice at the time of its change from cubic to hexagonal makes it easier to introduce the mercury and sulfide atoms therein. It will be apparent, therefore, that the process of the invention contemplates utilization, in admixture with the other ingredients, of cadmium sulfide alone or as associated with other inert compounds and furthermore either in an uncalcined or calcined state.

For the production of mercury sulfide in situ, mercury or a mercury carrier must of necessity be present to supply mercury that will react with the alkali sulfur containing compound to form mercuric sulfide. Mercury itself or any compound or salt thereof which is reactive under calcination conditions with an alkali thiosulfate or an alkali dithionite to form mercury sulfide may be utilized. In addition to mercury which will react with alkali thiosulfates and dithionites to form mercury sulfide, there may be mentioned other mercury suppliers or sources of mercury; namely, mercury compounds, such as mercurous and mercuric sulfates, chlorides, fluorides, bromides, iodides, chromates and oxides. Mercury salts of organic acids, such as the acetates of mercury, may also be employed. Other mercury compounds, of course, may be employed as successfully as those mentioned and in general, it has been found to date that no one compound is radically superior to another so long as the anion in the case of a mercury compound is reactive with the cation of the thiosulfate or dithionite to form an inert compound which preferably may be washed from the calcined mixture or when the anion or compound formed with the cation of the thiosulfate or dithionite is volatilized from the mixture in an inert or non-reactive condition with respect to the product formed. Color intensity and tinting strength are sometimes minimized, however, when the anion or a compound formed therewith is not removable, as by washing, from the pigment.

It will be recognized by those skilled in the art that mercury and several of its compounds, and especially mercury sulfide, readily sublime or volatilize under calcination conditions and, accordingly, the amount of the mercury compound employed in the initial mixture will depend, among other things, upon the severity of the calcination conditions chosen for the chemical transformation. It is believed that this chemical transformation amounts to one wherein the mercury sulfide is first formed and thereafter enters the crystal lattice of the cadmium sulfide to change its light defraction in a manner such that the red portion of the spectrum is reflected. In general, it has been found that the color of the pigment produced according to the invention will range from an orange or a reddish orange to a dark maroon which is almost black by utilizing an amount of mercury in the mixture which is sufficient to produce a mercuric sulfide to cadmium sulfide (HgS/CdS) weight ratio in the calcined product, ranging from about .07/1 to about .36/1. These proportions of mercury sulfide to cadmium sulfide are set forth as generally illustrative of the minimum quantities utilized in the initial mixture, assuming no losses of mercury during calcination. It will be appreciated, however, that because of the loss of mercury during calcination that greater quantities than the indicated amounts should be utilized in the original mixture. It has been found in many cases that as much as one-half of the mercury employed in the initial mix is lost during calcination and, accordingly, appropriate adjustments in the quantity of mercury supplier employed must be made to compensate for the severity of the calcination conditions and the influence thereof on the quantity of mercury lost from the mixture. It is, of course, understood that the mercury or mercury compound lost during calcination would usually in plant practices be recovered in a condensing or absorption system and returned as a raw material to the process.

Of the alkali thiosulfates and dithionites, the sodium salts, are preferred, although other alkali metal salts such as the potassium salts and other alkali thiosulfates and dithionites such as the ammonium salts are contemplated as being operative within the scope of the invention described herein. With respect to the utilization of alkali thiosulfates, such as sodium thiosulfate ($Na_2S_2O_3$) at least one mol of the alkali thiosulfate should be utilized per mol of mercury employed for the formation of mercuric sulfide. Where the mercury supplier contains more than one mol of mercury, it will be apparent that stoichiometric proportions are included. It has been found that an excess of the thiosulfate is usually desirable for substantial completion of the reaction and obtainment of a color within the red portion of the spectrum. In general, it is preferable to use from about one mol to about six mols of the thiosulfate per mol of mercury utilized for the formation of mercury sulfide. Quantities in excess of six mols may be utilized, although less economically, and generally with less satisfactory results as regards the obtainment of clean color. Within the broader preferred range of from about one to about six mols of alkali thiosulfate per mol of mercury, the most desirable colors to date have been obtained when either about one or four mols of the thiosulfate per mol of mercury are utilized. Thus the most desirable colors are obtained when from 1 to about 1.5 mols or when from about 3.5 to about 4.5 mols alkali thiosulfate are employed per mol of mercury. Although it has been found that a red pigment may be developed within the broad range, utilization of about 2 to 3 mols of alkali thiosulfate appears, nevertheless, to favor the development of a brownish tinge, which in some color applications may be unacceptable. Similarly, a brownish tinge appears to be developed when quantities in excess of about 4.5 mols of thiosulfate are utilized per mol of mercury. With respect to the utilization of an alkali dithionite, since the dithionite decomposes during calcination substantially according to the reaction heretofore set forth, it will be apparent that a range of proportions substantially twice that associated with the use of sodium thiosulfate should be employed since two mols of the dithionite are equivalent to about one mol of the thiosulfate in this respect.

The calcination of the mixture of ingredients is designed to promote the formation of mercuric sulfide and what is believed to be a solid solution thereof in cadmium sulfide. In this regard it is preferable that the calcination be conducted at temperatures generally ranging from about 375° C. to about 500° C. in order to develop a desired pigment during a reasonable calcination period. As is customary with most calcination reactions, the completion of the reaction is based on a time-temperature relationship. Practically the same color may be produced from a given mixture by calcining at different temperatures. Higher temperatures require a shorter period of time to develop the color than do lower temperatures. Prolonged calcination after the desired color has been developed causes additional sublimation of mercuric sulfide and has practically the same effect on the color developed as utilization of lesser amounts of mercury. Thus, calcination for periods of time in excess of the optimum required for developing a particular color materially lightens the color of the product obtained since losses of mercury or the compounds thereof, such as mercury sulfide, are increased through lengthy exposure to the calcination conditions.

Higher temperatures than those indicated as preferable may be employed, although, in general, the length of time to which the mixture is subjected to calcination is relatively shorter and more difficult to control in commercial scale operations. Also the pigments produced tend to increase in particle size with diminishing tinting strength when developed under higher calcination conditions, thus detracting from their pigment qualities. Red colored pigments have been produced according to the invention at temperatures as high as 700° C. It should be kept in mind, however, that mercury sulfide sublimes at about 580° C. and accordingly, greater quantities of the initial ingredient will be necessary for temperatures utilizing much in excess of this sublimation temperature in order to form the solid solution, whereas, smaller excess proportions may be used for lower temperatures. Similarly lower temperatures than 375° C. may be employed, although generally they are less desirable because of the prolonged periods necessary for the development of the color aspects. It may be pointed out that there is evidence that the reaction may be carried out at temperatures as low as 200° C. and good pigments have been produced at temperatures ranging in excess of 500° C. Of course, in addition to high temperature and lengthy periods of calcination, it will be apparent to those skilled in the art that the type of equipment employed for the calcination operation may similarly define the excess quantities of mercury or mercury compound employed since sublimation and volatilization are frequently related to the free volume over the charge undergoing calcination.

In the compounding of the pigments, it has been found as an expedient facilitating relatively homogeneous dispersion of the reactants on a laboratory scale to first mix the lithopone or cadmium sulfide with but one of the reactants forming mercury sulfide prior to the admixture of the other reactants. The alkali thiosulfate and mercury supplier usually react in appreciable amounts when first mixed and it is difficult to obtain adequate mixing of the cadmium sulfide therewith under such conditions. Thus the lithopone and mercury chloride may be first mixed as, for example, by dry grinding and thereafter subsequently mixed with the thiosulfate. Less desirably the thiosulfate may be mixed with the cadmium sulfide and the mercury supplier added last. Thus it has been found desirable to have either the thiosulfate or the mercury supplier thoroughly dispersed in the cadmium sulfide before the other component is added. After the mixing of the reactants, small amounts of water may be added to form a thick paste to further aid in the dispersion and then the paste may be dried and reground. After this regrinding, the product is then calcined as previously indicated and thereafter quenched, for example, in water to develop the desired color within the red portion of the spectrum. Washing of the pigment may then be accomplished to remove soluble salts which may be present in the pigment.

Although the method of admixing set forth in the prior paragraph is preferred, it will be appreciated that the invention is not to be thereby limited, since adequate mixing may be accomplished through simultaneous addition of all ingredients and further since the principal reason for utilizing the procedure set forth is to obtain as homogeneous a mixture of the component reactants as is possible. It will be found that when uncalcined lithopone or cadmium sulfate as, for example, in the form of a filter press cake are utilized that there is normally associated therewith water of adsorption. Consequently, lesser quantities of the water may be used in the formation of the paste as compared to when the dried, uncalcined lithopone or cadmium sulfide is utilized as the raw material. Similarly, when adequate mixing is accomplished good colors may be developed without the use of water for the formation of paste. Washing of the soluble salts from the pigment may also be dispensed with when desired, although in general it is desirable to remove the water soluble products to improve the cleanliness thereof and frequently because they are undesirable in paint or frit formulations.

The following examples are illustrative of the process of the herein described invention and are set forth by way of explanation thereof and not by way of limitation. The cadmium lithopones employed in the examples contained about 37.2% cadmium sulfide (CdS) and about 62.8% barium sulfate (BaSO$_4$) by weight.

*Example I*

20 grams of finely divided and precalcined cadmium lithopone was mixed with 2.71 grams of mercuric chloride by dry grinding. Thereafter 10 grams of powdered sodium thiosulfate pentahydrate was mixed with the mixture of cadmium lithopone and mercuric chloride by dry grinding. The whole mixture was then moistened with water to the consistency of a thick paste and stirred to aid in the dispersion of the thiosulfate throughout the mix. This paste was then dried at about 200° C. and thereafter ground through a 60-mesh screen and placed in a covered crucible. The crucible containing the ground mixture was then fired in an electric muffle at 550° C. for a period of 20 minutes. At the end of the firing time the crucible was removed and the contents immediately quenched in water and the slurry stirred to cause soluble salts to dissolve and to disintegrate any lumps of material present. Thereafter the pigment was filtered, washed and dried at a low temperature of about 105° C. The pigment obtained was soft and disintegrated readily to a fine medium red pigment.

*Example II*

To 40 grams of wet uncalcined cadmium lithopone, containing 20 grams of the lithopone on a dry basis, was added 2.71 grams of mercuric chloride, and sufficient additional water to make a relatively thick, yet stirrable paste, all of which was thoroughly mixed therewith by wet grinding. To this mixture was added 10 grams of powdered sodium thiosulfate pentahydrate and mixed therewith, again by wet grinding. This paste was thereafter dried, ground and calcined, quenched, and washed as in Example I. The finished product was again a fine medium red pigment.

*Example III*

To 20 grams of calcined substantially pure cadmium sulfide pigment was added 7.05 grams of mercuric chloride and 26 grams of sodium thiosulfate pentahydrate. The mixing of the ingredients and other processing steps was conducted substantially in accordance with the method set forth in Example I. The resulting powder was a fine, medium red pigment.

*Example IV*

20 grams of calcined cadmium lithopone, 4.07 grams of mercuric chloride and 15 grams of sodium thiosulfate pentahydrate were compounded and processed substantially in accordance with the method set forth in Example I, except that calcination was conducted for a period of 30 minutes at 550° C. The resulting pigment was a rich maroon color.

*Example V*

20 grams of calcined cadmium lithopone, 2.71 grams of mercuric chloride, and 16.45 grams of sodium dithionite (anhydrous) were employed in compounding a pigment substantially in accordance with the method employed in Example I. The dried product was a bright medium red pigment.

*Example VI*

Using the proportions of 20 grams of calcined cadmium lithopone, 1.86 grams of mercuric chloride and 8.0 grams of sodium thiosulfate pentahydrate, a pigment was compounded substantially in accordance with the methods set forth in Example I, except that the firing time was for 30 minutes at a temperature of 500° C. In this case a red pigment was obtained having a lighter shade than the pigment obtained in Example I.

*Example VII*

20 grams of calcined cadmium lithopone, 1.6 grams of mercuric oxide (HgO) and 8 grams of sodium thiosulfate pentahydrate were employed in compounding a pigment substantially in accordance with the method set forth in Example I, except that the firing time was for a period of 30 minutes at a temperature of 500° C. The product obtained was a medium red pigment.

*Example VIII*

A pigment was compounded substantially in accordance with the method set forth in Example I, except that the firing time was a period of 30 minutes at a temperature of 500° C., utilizing 20 grams of calcined cadmium lithopone, 2.65 grams of mercuric bromide (HgBr$_2$), and 8 grams of sodium thiosulfate pentahydrate. The product obtained was a bright medium red pigment.

*Example IX*

20 grams of calcined cadmium lithopone, 2.33 grams of mercury chromate (HgCrO$_4$), and 8 grams of sodium thiosulfate pentahydrate were compounded into a pigment substantially in accordance with the method set forth in Example I, except that the firing time was 30 minutes at a temperature of 500° C. The product obtained was a dark red powder.

*Example X*

20 grams of calcined cadmium lithopone, 1.62 grams of mercurous fluoride (HgF) and 8 grams of sodium thiosulfate pentahydrate were compounded into a pigment substantially in accordance with the method set forth in Example I, except that the firing time was 30 minutes at a temperature of 500° C. The product was a bright medium red pigment.

Example XI 20 grams of calcined cadmium lithopone, 1.75 grams of mercuric fluoride (HgF$_2$) and 8 grams of sodium thiosulfate pentahydrate were compounded into a pigment substantially in accordance with the method utilized in Example I, except that the firing time was for 30 minutes at a temperature of 500° C. The product was a bright medium red powder, exhibiting pigment characteristics.

Example XII 20 grams of calcined cadmium lithopone, 3.35 grams of mercuric iodide and 8 grams of sodium thiosulfate pentahydrate were compounded substantially according to the method set forth in Example I, except that the firing time was 30 minutes at a temperature of 500° C. The product developed was a bright medium red pigment, exhibiting pigment characteristics.

Example XIII 20 grams of calcined cadmium lithopone, 2.48 grams of mercurous sulfate, 10 grams of sodium thiosulfate pentahydrate were compounded substantially in accordance with the method set forth in Example I, except that the firing time was for 30 minutes at a temperature of 500° C. The product produced was a bright light maroon powder, exhibiting pigment characteristics.

Example XIV 20 grams of calcined cadmium lithopone, 2.95 grams of mercuric sulfate (HgSO$_4$) and 10 grams of sodium thiosulfate pentahydrate were compounded substantially in accordance with the method set forth in Example I, except that the firing time was 30 minutes at a temperature of 500° C. The product was a clean, dark red powder, exhibiting pigment characteristics.

Example XV 20 grams of calcined cadmium lithopone, 2 grams of metallic mercury, and 10 grams of sodium thiosulfate pentahydrate were compounded to a pigment, substantially in accordance with the method set forth in Example I, except that the firing time was 30 minutes and the temperature 500° C. The product was a maroon powder, exhibiting pigment characteristics.

Example XVI 20 grams of calcined cadmium lithopone, 3.19 grams of mercuric acetate, and 10 grams of sodium thiosulfate pentahydrate were compounded into a pigment substantially by the method as set forth in Example I, except that they were calcined at a temperature of 500° C. for 30 minutes. The product produced had a light maroon color.

Example XVII 20 grams of calcined cadmium lithopone, 7.9 grams of potassium thiosulfate containing one-third mol of water of hydration, and 2.71 grams of mercuric chloride were compounded into a pigment substantially in accordance with the method set forth in Example I, except that the time of firing was 30 minutes at a temperature of 500° C. A maroon powder, exhibiting pigment characteristics, was obtained.

Example XVIII

A pigment substantially identical in composition to that set forth in Example VI, except that it contained in addition 5 grams of sodium chloride, was prepared substantially in accordance with the method set forth in Example I, except that the firing time was for a period of 15 minutes at 500° C. The product obtained was a bright, medium red powder.

Example XIX

The following examples are set forth to show the relationship between the firing time and the temperature. In all cases the processing conditions involved in the compounding of the pigment were substantially in accordance with the method set forth in Example I, except as indicated below:

| Calcined cadmium lithopone, grams | Mercuric chloride, grams | Sodium thiosulfate pentahydrate, grams | Firing time | Firing temp., ° C. | Color |
|---|---|---|---|---|---|
| 20 | 1.36 | 5 | 15 min | 550 | Reddish orange. |
| 20 | 2.71 | 10 | 15 min | 550 | Medium red. |
| 20 | 4.07 | 16.3 | 20 min | 550 | Do. |
| 20 | 2.71 | 10 | 15½ hrs | 400 | Orange red. |
| 20 | 2.71 | 10 | 3 hrs | 450 | Reddish orange. |
| 20 | 2.71 | 10 | 30 min | 500 | Medium red. |
| 20 | 2.71 | 10 | 15 min | 550 | Do. |
| 20 | 2.71 | 10 | 12 min | 600 | Light red. |
| 20 | 2.71 | 10 | 7 min | 625 | Do. |

I claim:

1. The method for producing a red pigment comprising admixing cadmium sulfide, an alkali sulfur containing compound selected from the group consisting of alkali thiosulfates and alkali dithionites, and a mercury supplier which forms mercury sulfide by reaction with said alkali sulfur compound upon calcination, and then calcining said admixture at a temperature from 200° to 700° C., the amount of mercury supplier admixed being sufficient to produce a weight ratio of mercuric sulfide to cadmium sulfide (HgS/CdS) in the calcined product of from about .07/1 to about .36/1, and the amount of alkali sulfur containing compound admixed being equivalent to from about 1 mol to about 6 mols of alkali thiosulfate per mol of mercury in said mercury supplier.

2. The method according to claim 1 where said mercury supplier is selected from the group consisting of mercury, and mercuric and mercurous sulfates, chromates, acetates, oxides, chlorides, iodides, fluorides and bromides.

3. The process according to claim 1 where the amount of alkali metal sulfur containing compound admixed is selected from the amount equivalent to from about 1 mol to about 1.5 mols of alkali thiosulfate per mol of mercury in said mercury supplier and the amount equivalent to from about 3.5 to about 4.5 mols of alkali thiosulfate per mole of mercury in said mercury supplier.

4. The method for producing a red pigment comprising admixing cadmium sulfide, an alkali sulfur containing compound selected from the group consisting of alkali thiosulfates and alkali dithionites, and a mercury supplier which forms mercury sulfide by reaction with said alkali sulfur compound upon calcination, and then calcining said admixture at a temperature from 375° C. to 500° C., the amount of mercury supplier admixed being sufficient to produce a weight ratio of mercuric sulfide to cadmium sulfide (HgS/CdS) in the calcined product of from about .07/1 to about .36/1, and the amount of alkali sulfur containing compound admixed being equivalent to from about 1 mol to about 6 mols of alkali thiosulfate per mol of mercury in said mercury supplier.

5. The method of producing a red pigment comprising first admixing cadmium sulfide and a mercury supplier which forms mercury sulfide by reaction with an alkali sulfur containing compound upon calcination, the alkali sulfur compound being selected from the group consisting of alkali thiosulfates and alkali dithionites, secondly admixing an alkali sulfur containing compound selected from the group consisting of alkali thiosulfates and alkali dithionites with the first admixture, thereafter adding water to said second admixture to form a paste, and then drying said paste and calcining the dried paste at a temperature from 375° C. to 500° C., the amount of mercury supplier admixed being sufficient to produce a weight ratio of mercury sulfide to cadmium sulfide (HgS/CdS) in the calcined product of from .07/1 to about .36/1, and the amount of alkali sulfur containing compound admixed being equivalent to from about 1 mol to about 6 mols of alkali thiosulfate per mol of mercury in said mercury supplier.

6. The method of producing a red pigment comprising first admixing cadmium sulfide and an alkali sulfur containing compound selected from the group consisting of alkali thiosulfates and alkali dithionites, secondly admixing with said first admixture a mercury supplier which forms mercury sulfide by reaction with said alkali sulfur containing compound upon calcination, thereafter adding water to said second admixture to form a paste, and then drying said paste and calcining the dried paste at a temperature from 375° C. to 500° C., the amount of mercury supplier admixed being sufficient to produce a weight ratio of mercury sulfide to cadmium sulfate (HgS/CdS) in the calcined product of from .07/1 to about .36/1, and the amount of alkali sulfur containing compound admixed being equivalent to from about 1 mol to about 6 mols of alkali thiosulfate per mol of mercury in said mercury supplier.

References Cited in the file of this patent

UNITED STATES PATENTS

| | | |
|---|---|---|
| 2,061,368 | O'Brien | Nov. 17, 1936 |
| 2,173,895 | Booge | Sept. 26, 1939 |
| 2,195,118 | Mowlds | Mar. 26, 1940 |
| 2,226,573 | O'Brien | Dec. 31, 1940 |
| 2,504,147 | O'Brien | Apr. 18, 1950 |

OTHER REFERENCES

Pages 537–542 of "Physical Chemistry," vol. 47, 1943, dealing with the studies in the co-precipitation of cadmium and mercuric sulfides by Rittner et al.

Page 945 of Mellor's Comprehensive Treatise on Inorganic and Theoretical Chemical (vol. 4), 1923.

See pages 18, 19 and 20 of Mattiello's book entitled Protective and Decorative Coatings, vol. 2 (1942), published by John Wiley & Sons Inc., New York.